United States Patent
Lenz

(10) Patent No.: US 10,030,787 B2
(45) Date of Patent: Jul. 24, 2018

(54) ACTUATOR

(71) Applicant: Cameron International Corporation, Houston, TX (US)

(72) Inventor: Norbert Lenz, Celle (DE)

(73) Assignee: ONESUBSEA IP UK LIMITED, London, England (GB)

( * ) Notice: Subject to any disclaimer, the term of this patent is extended or adjusted under 35 U.S.C. 154(b) by 0 days.

(21) Appl. No.: 14/891,968

(22) PCT Filed: Apr. 22, 2013

(86) PCT No.: PCT/EP2013/001197
§ 371 (c)(1),
(2) Date: Nov. 17, 2015

(87) PCT Pub. No.: WO2014/173422
PCT Pub. Date: Oct. 30, 2014

(65) Prior Publication Data
US 2016/0153580 A1    Jun. 2, 2016

(51) Int. Cl.
*F16K 1/02* (2006.01)
*F16K 27/00* (2006.01)
(Continued)

(52) U.S. Cl.
CPC .......... *F16K 31/56* (2013.01); *F16K 31/047* (2013.01); *F16K 27/00* (2013.01)

(58) Field of Classification Search
CPC ............ F16H 25/20; F16H 2025/2071; F16K 31/047; F16K 1/02; F16K 27/00; F16K 27/044; F16K 3/02; H02K 7/116; Y10T 74/18696; Y10T 74/18056; F16D 43/22; F16D 41/04; G05G 15/00; G05D 16/202; G05D 7/0635; E21B 34/066
See application file for complete search history.

(56) References Cited

U.S. PATENT DOCUMENTS 3,659,683 A * 5/1972 Betzing ............... F16H 25/2204
                                                                188/162
5,497,672 A * 3/1996 Appleford ............... E21B 34/04
                                                                185/40 R
(Continued)

FOREIGN PATENT DOCUMENTS

DE         10134428 A1      1/2003
WO    WO 2011006519 A1 *    1/2011    ......... E21B 33/0355

OTHER PUBLICATIONS

PCT International Search Report and Written Opinion; Application No. PCT/EP2013/001197; dated Jan. 24, 2014; 11 pages.

*Primary Examiner* — Seth W Mackay-Smith
(74) *Attorney, Agent, or Firm* — Fletcher Yoder, P.C.

(57) ABSTRACT

An actuator for actuating a valve mechanism, such as a gate valve mechanism, a blow-out preventer or the like for maritime oil or gas production. The actuator includes at least one motor housing. The motor housing includes an electric motor, a vehicle adapter at a first housing end of the motor housing to dock with a remote controlled vehicle, and a connection adapter at a second housing end to dock with a spring assembly housing disposed on the valve mechanism. The spring assembly housing includes a spring assembly that pressurizes a spring piston displaceably mounted in the spring assembly housing.

20 Claims, 4 Drawing Sheets

(51) Int. Cl.
  *F16K 31/04* (2006.01)
  *F16H 25/20* (2006.01)
  *G05D 7/06* (2006.01)
  *G05D 16/20* (2006.01)
  *F16K 31/56* (2006.01)

(56) References Cited

U.S. PATENT DOCUMENTS

| | | | | |
|---|---|---|---|---|
| 5,865,272 A * | 2/1999 | Wiggins | ............ | F16H 25/2018 185/40 R |
| 6,572,076 B1 * | 6/2003 | Appleford | ............ | F16K 31/047 251/69 |
| 8,281,863 B2 * | 10/2012 | Voss | ............ | F16K 3/0254 166/332.4 |
| 8,973,451 B2 * | 3/2015 | Oswald | ............ | E21B 41/0007 251/69 |
| 8,978,687 B2 * | 3/2015 | Lenz | ............ | F16K 31/047 137/81.2 |
| 2003/0145667 A1 * | 8/2003 | Donald | ............ | F16K 31/047 74/89.26 |
| 2005/0029476 A1 * | 2/2005 | Biester | ............ | E21B 33/0355 251/58 |
| 2006/0243936 A1 * | 11/2006 | Hoang | ............ | E21B 34/04 251/63 |
| 2008/0264646 A1 * | 10/2008 | Sten-Halvorsen | .. | E21B 33/0355 166/360 |
| 2009/0211762 A1 * | 8/2009 | Voss | ............ | F16K 3/0254 166/351 |
| 2012/0153198 A1 * | 6/2012 | Biester | ............ | E21B 33/0355 251/129.12 |
| 2012/0234117 A1 * | 9/2012 | Oswald | ............ | E21B 41/0007 74/89.39 |
| 2012/0241007 A1 * | 9/2012 | Lenz | ............ | F16K 31/047 137/1 |
| 2015/0316169 A1 * | 11/2015 | Bohaychuk | ............ | F16K 3/246 251/58 |

* cited by examiner

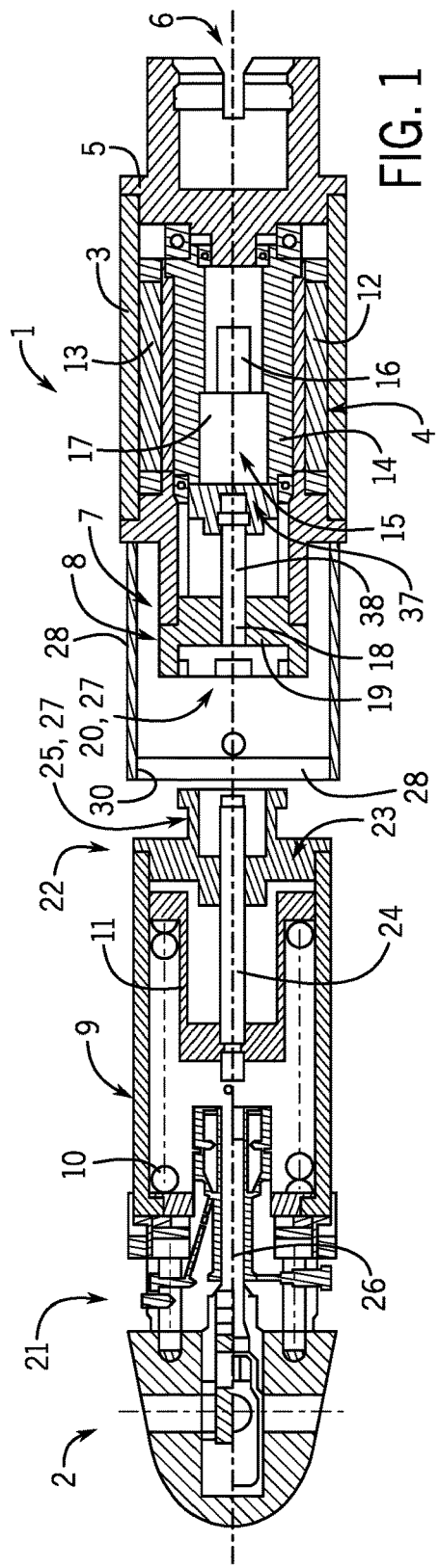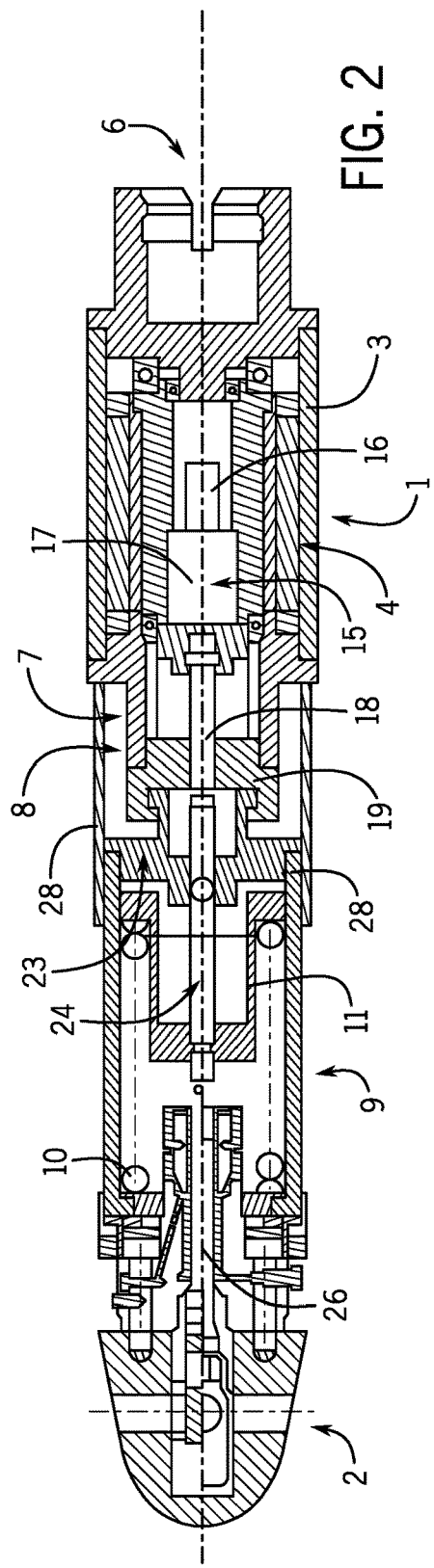

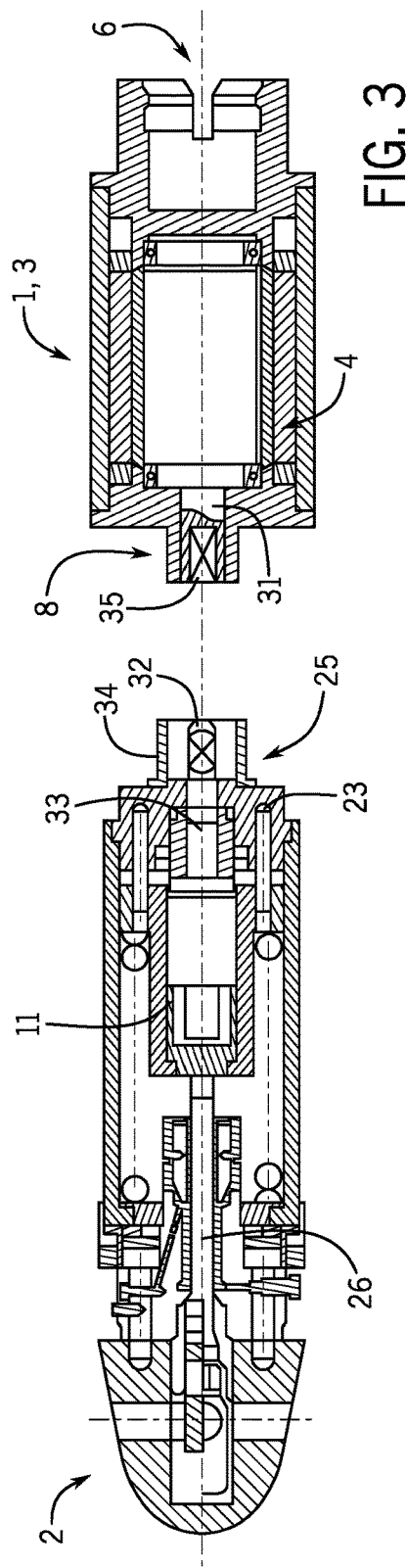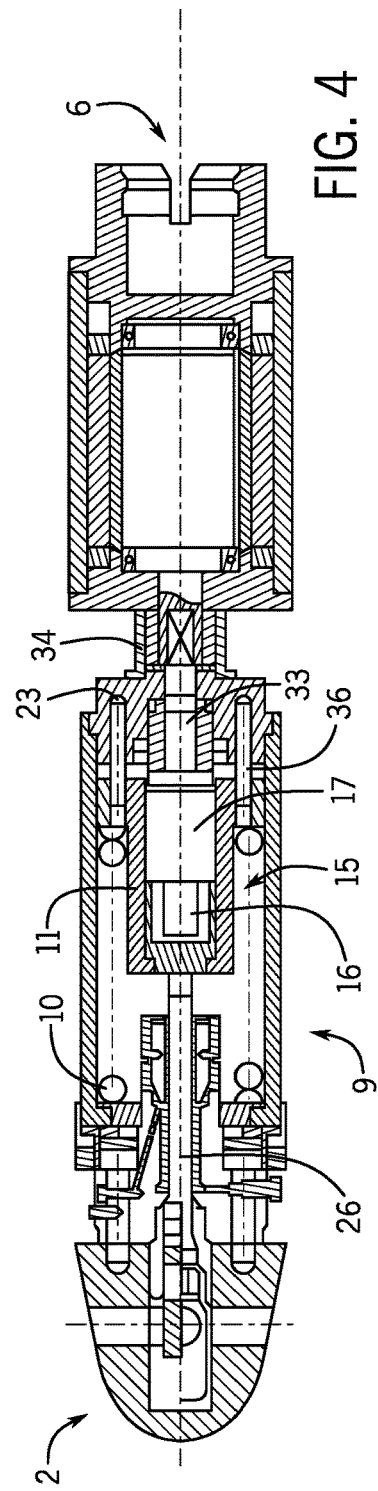

ACTUATOR

CROSS-REFERENCE TO RELATED APPLICATION

This application is a US National Stage of International Application No. PCT/EP2013/001197, entitled "ACTUATOR", filed Apr. 22, 2013, which is herein incorporated by reference in its entirety.

BACKGROUND

Actuators for actuating a valve mechanism such as a gate valve mechanism, a blow-out preventer or the like may be arranged on the seabed in the maritime gas or oil production. Each valve mechanism comprises a corresponding valve member that, for example, opens or closes a pipe. The valve mechanisms are installed, for example, in a Christmas tree and each valve mechanism is associated with at least one actuator. Such an actuator comprises at least a motor housing with an electric motor and usually a threaded spindle device. By means of the threaded spindle device, rotational motion of the electric motor is transformed into linear motion serving to adjust the respective valve member. For reasons of redundancy, two or more electric motors may be provided, so that in the event of an electric motor failing, the respective task of adjusting the threaded spindle device and thereby the valve member may be assumed by another electric motor.

BRIEF DESCRIPTION OF THE DRAWINGS

For a detailed description of examples of the disclosure, reference will now be made to the accompanying drawings in which:

FIG. 1 shows a longitudinal section through a motor housing of an actuator, a spring assembly housing and partly through a valve mechanism accordance to a first embodiment of the present disclosure;

FIG. 2 shows a longitudinal section similar to FIG. 1 with the motor housing connected to the spring assembly housing;

FIG. 3 shows a longitudinal section similar to FIG. 1 for a second embodiment of the present disclosure;

FIG. 4 shows a longitudinal section similar to FIG. 2 with the motor housing connected to the spring assembly housing for a second embodiment of the present disclosure;

NOTATION AND NOMENCLATURE

Figure 5A:
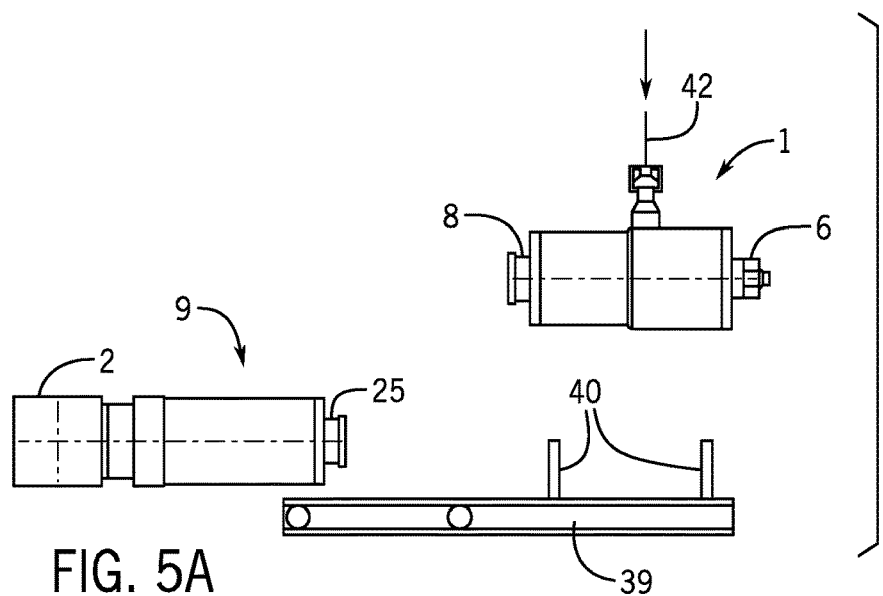
FIGS. 5*a*-5*c* show side views of various steps for lowering and docking an actuator to the spring assembly housing.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

In accordance with various embodiments of the present disclosure, valve mechanisms as described above may have three different operating modes. In a first mode, the respective valve member is automatically moved to its closed position in the event of a power failure, which is referred to as "fail safe close." In a second mode, the valve member is automatically moved to the open position in the event of a power failure. Such a mode of operation is referred to as "fail safe open." Finally, the valve member in a third mode of operation in the event of a power failure remains in the assumed position, which is referred to as "fail as is".

For the first two modes of operation, at least one spring assembly is compressed when the valve member is extended. This spring assembly provides the energy required to close or to open the valve member. This occurs even when no respective borehole pressure should exist, which could press the valve member into a specific position. By means of the actuator and via the threaded spindle device and the electric motor, a pressure force is transmitted to the valve member. Once the valve member is adjusted by the actuator, it holds the valve member in the assumed position consuming as little holding current as possible. If this holding current is interrupted, the actuator moves to the closed or the open position depending on the above-mentioned mode of operation. Such an interruption of the holding current may be intentional or unintentional, where unintentional interruption of the holding current may be caused for example by a power outage.

Damping elements are used to reduce the movement of the valve member and also of the other moving parts in the closing speed, in particular when returning the valve member against the actuator. One option is a damper in the actuator or the use of a spring assembly as a damper. Actuators and respective valve mechanisms known from practice are usually fixedly connected with each other, where a spring assembly housing with a respective spring assembly is additionally arranged between the actuator and the valve mechanism. Such a spring assembly serves to pressurize at least a spring piston displaceably mounted in the spring assembly housing. The respective spring assembly is disposed between the actuator housing and the valve mechanism.

In accordance with various embodiments, and to simplify maintenance and repair work of a respective actuator, an actuator is detachably affixed to the spring assembly housing. Electrical components may be disposed in the actuator, such as the above-mentioned electric motor. Other electrical components include connectors, sensors, data transmission equipment and the like. In some cases, such electrical components are associated with a higher likelihood of failure than components moved and operated purely mechanically. If the actuator fails despite redundancy of the electric motor, then the entire Christmas tree including the actuator, the spring assembly housing, the valve member, and possibly further devices would, for example, need to be hoisted to the sea surface for repair or maintenance work. This prevents the use of the entire tree with the various devices and maintenance or repair work is time consuming and expensive.

According to various embodiments of the present disclosure, the actuator and in particular the associated actuator housing or motor housing may be separated from the spring assembly housing and thereby from the valve mechanism. To accomplish this, a vehicle adapter for docking a remote controlled vehicle is formed at a first end of the motor housing and a connection adapter for docking to the spring assembly housing disposed on the valve mechanism is formed at the second end of the housing. Such a remote-controlled vehicle may be a remotely operated vehicle (ROV). The ROV approaches the actuator under water and docks to the actuator by means of the vehicle adapter. By proper operation of the vehicle, the actuator may then be detached from the spring assembly housing, allowing only the actuator to be brought to the water surface for maintenance, repair purposes, or to be exchanged. This reduces the time and cost required to perform such maintenance or repair. In certain cases, the respective vehicle may dock to the spring assembly housing in addition to the vehicle adapter after the actuator has been removed. This allows an emergency actuation of the valve member by the vehicle, such as closing or opening the valve mechanism.

In some cases, this may be referred to as "double docking" of the ROV, where the actuator is removed and an emergency operation is performed. This may also eliminate the need to have an additional mechanical adjusting device in the actuator, which might otherwise be present in the actuator.

Additionally, in some embodiments the actuator is lowered with a rope or the like from the sea surface down to its site of operation. This lowering may possibly take place with the assistance of an ROV. Down at the site of operation (e.g., at the Christmas tree) the actuator may be placed onto a carriage or other guide. The carriage enables the actuator to be pushed to the spring assembly housing and docked there. This pushing and docking may also be done by means of an ROV.

Different motors may be used as the electric motor, which may be a low-revolutions per minute (RPM), high-torque motor. One example of such an electric motor is a so-called torque motor comprising a stator, a rotor and a hollow shaft rotating together with the rotor. The rotor is usually attached to the hollow shaft. In some cases a clutch and/or transmission gear device may be included. The gear device enables relatively high rotational speeds of the electric motor to be reduced to the required low rotational speeds for adjusting the valve member. The clutch means may, for example, be used to interrupt the drive train at high torque, so that the gate valve is not moved to a position in which damage may occur in particular to the valve mechanism. When using a torque motor, it may engage other devices directly by means of the hollow shaft, or other drive devices may be inserted between the hollow shaft and the valve member for its adjustment.

In order to convert the rotational motion of the hollow shaft to axial motion in a simple manner, a threaded spindle device may be arranged between, for example, the hollow shaft and the valve member. According to the present disclosure, there is the option of the actuator comprising this threaded spindle device consisting of a spindle and a spindle nut, where the spindle nut is rotationally connected to the hollow shaft. Thus, the threaded spindle device is disposed within the motor housing and could then likewise be replaced together with the actuator.

In this context, the spindle at its first end facing towards the valve mechanism may have an associated spindle head that is designed as a connection adapter on its outer side facing towards the spring assembly housing. The connection adapter enables the actuator to be detachably connected by the ROV on the spring assembly housing. The spindle head comprises an opening for, for instance, the spindle to enable adjustment in the axial direction. In some cases, the spindle may be connected coaxially via the spindle head to an intermediate rod. The intermediate rod is then guided through the connection adapter, and may be directly or indirectly connectable to the valve member for its adjustment.

The spring assembly housing may be closeable on its actuator end facing away from the valve mechanism by a housing insert for axially displaceable mounting of a connection shaft and an adapter counterpart for the connection adapter. This provides a corresponding counterpart to the connection adapter in a mechanically simple manner. The corresponding connection shaft may be connected to either the spindle or the intermediate rod, given a corresponding connection between the adapter counterpart and the connection adapter, so that the connection shaft is likewise axially adjusted by the spindle and thereby transmits the axial adjustment to the valve member.

Additionally, in some cases, the connection shaft is arranged between the spindle and the valve member for direct transmission of the axial adjustment.

As noted above, the spring assembly may have various functions for the adjustment of the valve member. In order to easily adjust the spring assembly by displacing the connection shaft, the connection shaft may be mounted axially immovably in the spring piston. As a result, the pressure force tensions the spring assembly via the spring piston for axial displacement of the connection shaft against the pressure force of the spring assembly. The corresponding tension of the spring assembly may be used for one of the above-mentioned modes of operation for adjusting the valve member. This also applies when using the spring assembly as a damper.

In some embodiments it may be advantageous if the connection adapter and the adapter counterpart are detachably connected with each other by means of a quick coupling device. The ROV may additionally comprise such a connection adapter so that the ROV may dock to the adapter counterpart after removing the actuator.

To protect such devices between the spring assembly housing and the motor housing in the connection position, a push-on sleeve may be arranged on the motor housing encompassing the connection adapter and projecting beyond it in the direction towards the spring assembly housing. With the motor housing and the spring assembly housing being connected to one another, the quick coupling device, the housing insert, or the adapter counterpart and the connection adapter are protected. Furthermore, a connection shaft may project into this area, so that it is likewise protected by the push-on sleeve. Additionally, the push-on sleeve may be used as a support when the adapter housing is to be attached by the ROV to the spring assembly housing. In this way, the push-on sleeve assumes an aiming, guiding, or centering function. The guiding function may be enhanced by including a push-on bevel at the open end edge of the push-on sleeve (i.e., the end of the push-on sleeve, that is pushed onto the spring assembly housing).

In the above-described embodiments, the threaded spindle device is disposed in the motor housing and is separated together with the actuator from the spring assembly housing and the valve mechanism. However, the threaded spindle device is an essentially mechanical device, so that it generally needs to be serviced or replaced less frequently. In addition, a respective threaded spindle device is relatively heavy and thus it may be advantageous to avoid disposing the threaded spindle device in the motor housing. According to another embodiment of the present disclosure, the threaded spindle device is installed in the spring assembly housing. In this case, the actuator housing is replaced with the respective electrical devices, such as the motor, connectors, data transmission equipment, the sensor and the like; however, the threaded spindle device remains in situ with the spring assembly housing.

In this case, the threaded nut could be affixed in the spring piston and could be moved axially against the pressure action of the spring assembly when rotating the threaded spindle with the spring piston. By respectively rotating the spindle, the threaded nut is moved in the axial direction and entrains the spring piston due to its attachment to the spring piston. The spring piston may be directly connected to the valve member for its simultaneous axial adjustment.

In this case, the spindle could be rotationally mounted in the housing insert. As explained above, the housing insert is also used for docking the motor housing, for example by way of the connection adapter and adapter counterpart.

One option for providing a direct coupling for transmitting the rotational motion is rotationally connecting the hollow shaft with an insertion end member, where a male end member associated with the spindle for rotational connection to the spindle is formed in the insert end member. In this manner, the spindle may be rotationally connected directly to the corresponding insertion end member or may be connected to the male end member via a connection member rotationally and sealingly mounted in the housing insert.

Such a connection member may be rigidly connected to a respective end of the spindle and engages with the male end member when docking the motor housing to the spring assembly housing and connecting the connection adapter and the adapter counterpart. As a result, there is a rotational connection between the hollow shaft and the rotating spindle.

The vehicle adapter may close the motor housing at one end and may also be used directly for rotationally mounting the hollow shaft. Thus, the vehicle adapter comprises an end portion, projecting in the direction of the hollow shaft, on which the hollow shaft is rotationally mounted.

For protection of the connection member, same may be arranged substantially centrally in a protective sleeve projecting from the housing insert in the direction of the motor housing. The protective sleeve may also serve as a guide sleeve supporting the insertion of the connecting member. In this embodiment, the protective sleeve and the connection member may form an adapter counterpart that connects with the connection adapter of the motor housing during docking. This adapter counterpart may also be used by the ROV directly for actuation in an emergency.

The parts previously described and, in particular, the spring assembly housing may be structured in a modular manner. This enables the spring assembly housing to be designed for the arrangement of the spring assembly, the spring piston, the connection shaft, the threaded spindle device and/or the housing insert. As a result, different housing inserts may be used in the same spring assembly housing depending on whether the threaded spindle device is arranged in the spring assembly housing or in the motor housing. An analogous application may be extended to the spring piston or other devices within the spring assembly housing. For example, the spring assembly may in both embodiments be the same.

Overall, a detachable actuator results that is simple in design and easily detachable from the spring assembly housing and valve mechanism by an ROV. At the same time, an appropriate motor housing enables the ROV to be docked directly to the spring assembly housing in order to perform an emergency operation when the actuator is removed.

FIG. 1 shows a longitudinal section through a first embodiment according to the present disclosure. An actuator 1 with an actuator or motor housing 3, respectively, is arranged spaced to a valve mechanism 2 with a spring assembly housing 9 detachably affixed thereto. In the motor housing 3, a torque motor is arranged as an electric motor 4, which comprises a stator 12, a rotor 13, and a hollow shaft 14. The rotor 13 is arranged externally on the hollow shaft 14. The hollow shaft is rotationally mounted at its ends, for example through the mounting on the first housing end 5 to a vehicle adapter 6. The vehicle adapter 6 closes the motor housing 3 at the first housing end 5 and partially protrudes into the motor housing 3. The hollow shaft is rotationally mounted on this protruding part of the vehicle adapter 6. Inside the hollow shaft, a threaded spindle device 15 is arranged with a spindle 16 and a spindle nut 17. The spindle nut 17 is rotationally fixed relative to the hollow shaft 14. As a result, the spindle nut 17 rotates together with the hollow shaft 14 during operation of the torque motor 4. When rotating the spindle nut 17, the spindle 16 is displaced to the left or to the right in FIG. 1, depending on the direction of rotation of the spindle nut 17.

At the exterior of the hollow shaft 14, the spindle 16 has a guide head 37, which is laterally supported in a non-rotatable manner by projecting pins or the like. The guide head 37 is axially displaceable together with the spindle 16. An extension rod 38 is arranged on the side of the guide head 37 facing away from the spindle 16. It may be manufactured integrally with the spindle 16. On the free end of the extension rod 38, a spindle head 19 is provided simultaneously being formed as a connection adapter 8. On its outer side, the connection adapter 8 is encompassed by a push-on sleeve 28, which extends beyond the connection adapter 8 in the direction of the spring assembly housing 9. In the region of an open end edge 29, the push-on sleeve 28 comprises a push-on bevel 30, which extends obliquely outwards in particular in the direction of the spring assembly housing 9.

On an outer side 20 facing the spring assembly housing 9, the adapter 8 includes a quick coupling device 27, which is formed complementary to a corresponding quick coupling device 27 on the adapter counterpart 25 on the spring assembly housing 9. This quick coupling device 27 is arranged as part of the connection adapter 8 on the second housing end 7 of the motor housing 3.

The vehicle adapter 6 comprises an opening facing outwardly, to which a respective vehicle may dock, such as an ROV.

The adapter counterpart 25 is attached to the spring assembly housing 9 and arranged partly therein at its actuator end 22 facing the actuator 1. The adapter counterpart 25 not only serves to dock with the connection adapter 8, but also to axially mount a connection shaft 24. The connection shaft 24 is mounted in an axially displaceable manner in the adapter counterpart 25 and, with the motor housing 3 and the spring assembly housing 9 being connected (e.g., as shown in FIG. 2), the connection shaft 24 engages with a first end 18 of the spindle 16 or the extension rod 38, respectively. In this manner, the connection shaft 24 is displaced together with the axial adjustment of the spindle 16 during rotation of the spindle nut 17. At its other end, the connection shaft 24 is connected with a valve member 26. It is displaceable, for example, between an open and a closed position within the valve advance device 2.

In the spring assembly housing 9, a spring piston 9 is further arranged in an axially displaceable and sealed manner. The spring piston 11 together with an end flange of the spring assembly housing 9 serves to arrange the spring assembly 10. When displacing the spring piston 11 towards the valve mechanism 2, the spring assembly 10 is compressed.

In some embodiments, the ROV may also dock to the adapter counterpart 25 in order to directly adjust the valve member 26 by means, for example, of the connection shaft 24 after removal of the actuator 1.

A mounting device 21 is arranged between the spring assembly housing 9 and the valve mechanism 2 The mounting device 21 enables the spring assembly housing 9 to be attached to the valve mechanism 2.

FIG. 2 illustrates the embodiment according to FIG. 1 in an assembled position of the actuator 1 and the spring assembly housing 9. The description of the components of FIG. 1 applies in general to FIG. 2 as well.

FIG. 2 shows the push-on sleeve 28 partly pushed from the outside onto the spring assembly housing 9. In this position, the adapter counterpart 25 and the connection adapter 8 are attached to each other by means of the quick coupling device 27. At the same time, a connection is created between the connection shaft 24 and the spindle 16, so that the connection shaft 24 is also axially adjustable when respectively axially adjusting the spindle 16. The connection shaft 24 is fixedly mounted in the interior of the spring piston 11, so that the spring piston 11 is respectively for axial adjustment of the connection shaft 24 also axially moved against the pressure action of the spring assembly 10.

The connecting position of the actuator or the motor housing 3, respectively, and the spring assembly housing 9 is effected by means of the vehicle adapter 6 by docking the ROV. This also applies for detaching the two housings from each other. In the position of FIG. 1, the actuator 1 may be easily carried by the ROV to the sea surface for maintenance or replacement purposes. Respective electrical devices are disposed within the actuator, such as a torque motor 4, sensors, data transmission equipment or the like. Essentially only mechanical components, such as the spring assembly 10, the spring piston 11 or the connection shaft 24 are disposed in the spring assembly housing 9.

FIGS. 3 and 4 show a second embodiment of the present disclosure. It differs in particular from the preceding embodiment by the additional arrangement of the threaded spindle device 15 in the spring assembly housing 9.

The actuator 1 with the motor housing 3 again contains the respective torque motor 4 and the vehicle adapter 6 at one end, and the connection adapter 8 at the other end 22. The respective hollow shaft 14 of the torque motor 4 is connected to a rotationally mounted insertion end member 31. The insertion end member 31 is rotationally mounted in the connection adapter 8 and in the region of the latter comprises an insertion opening 35. Therein, a male end member 32 is provided for coupling the motor housing 3 and the spring assembly housing 9 and in particular for the rotatable connection of the insertion end member 31 or the hollow shaft 14, respectively, and spindle 16. The male end member 32 is disposed at the end of a rod-shaped connection member 33, which is rotationally connected to the spindle 16. Within the housing insert 23, the connection member 33 is mounted rotationally but axially non-displaceably.

In another embodiment according to FIGS. 3 and 4, the rotor of the torque motor 4 is connected to a solid shaft as the insertion end member 31. The insertion end member 31 comprises the insertion opening 35 at its free end. In some cases, the insertion end member 31 with the insertion opening 35 is mounted onto such a solid shaft (e.g., through a bolt connection). The insertion end member 31 then receives the male end member 32 in a rotationally fixed manner of in the respective insertion opening 35.

The spring piston 11 is attached to the housing insert 23, but mounted displaceably in the axial direction. A spring assembly 10 is respectively again disposed between the spring piston 11 and an end flange of the spring assembly housing 9.

In this embodiment, the threaded spindle device 15 is provided with the spindle 16 and the spindle nut 17 inside the spring piston 11. The spindle nut 17 is disposed in the spring piston 11 in a rotationally fixed manner, so that when respectively rotating the spindle 16, the spindle nut 17 together with the spring piston 11 is adjustable in the axial direction together with the valve member 26. For axially displaceable mounting of the spring piston 11 relative to the housing insert 23, guides 36 are provided on which the spring piston 11 is displaceably mounted in the axial direction. The guides 36 may also be designed as pins serving, in particular, to absorb torque. They are, for example, fixedly attached to the spring piston 11 and arranged axially displaceably in the housing insert 23. However, further examples of such torque absorptions are also conceivable, such as for example, a guide similar to the sleeve with guide grooves shown in FIGS. 1 and 2, the sleeve surrounding the guide head 37, and the guide pins projecting radially outwardly from the guide head 37 and engaging in the guide grooves. Instead of respective guide pins, guide rollers may also be used which are movable in the axial direction.

In FIG. 4, the motor housing 3 and the spring assembly housing 9 are respectively arranged in a connected position, where a protective sleeve 34 surrounding the male end member 32 may be pushed from the outside onto the connection adapter 8. When pushed on, the male end member 32 is inserted into the insertion opening 35. A resulting polygonal cross-section is formed in order to rotate the connection member 33 and thereby the spindle 16 when rotating the insertion end member 31 or of the hollow shaft 14, respectively. By rotating the spindle 16, which is axially fixed, there is an axial adjustment of the spindle nut 17 and thereby also an axial displacement of the spring piston 11.

In the second embodiment, the motor housing 3 is smaller than in the first embodiment and is also lighter, since the threaded spindle device 15 is not disposed in the motor housing 3, but rather is located in the spring assembly housing 9. Otherwise, detaching and connecting the motor housing 3 and the spring assembly housing 9 occurs similarly to the first embodiment. Also in the second embodiment, direct docking of the ROV to the adapter counterpart 25 and in particular at the male end member 32 is possible.

According to the present disclosure, separation of the actuator from the spring assembly housing is possible in a simplified manner. An ROV may exchange an actuator under water to be serviced or to be replaced. The ROV may, after removal of the actuator, also dock directly to the spring assembly housing and perform an emergency operation.

The illustrated actuators each comprise a torque motor with no gear or clutch. However, clutches or transmission gear devices may additionally be disposed in the motor housing 3. In the first embodiment, the threaded spindle device 15 is arranged in the motor housing 3 such that the actuator transmits a pressure force in the direction of the spring assembly due to the axial movement of the spindle 16. In the second embodiment, the threaded spindle device 15 is arranged in the spring assembly housing, where the actuator in this case transmits a rotary motion and in particular a torque (e.g., resulting in rotation of the spindle 16 via the insertion end member 31 and the hollow shaft). In both embodiments, the actuator is easily replaceable even under water. Simultaneously, the ROV may perform an emergency operation.

Figure 5B:
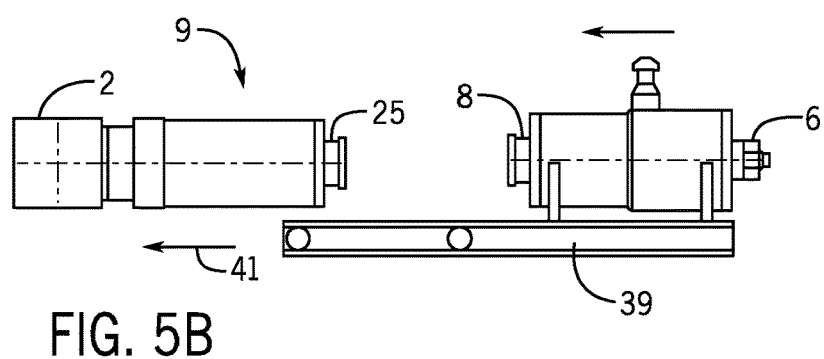
Figure 5C:
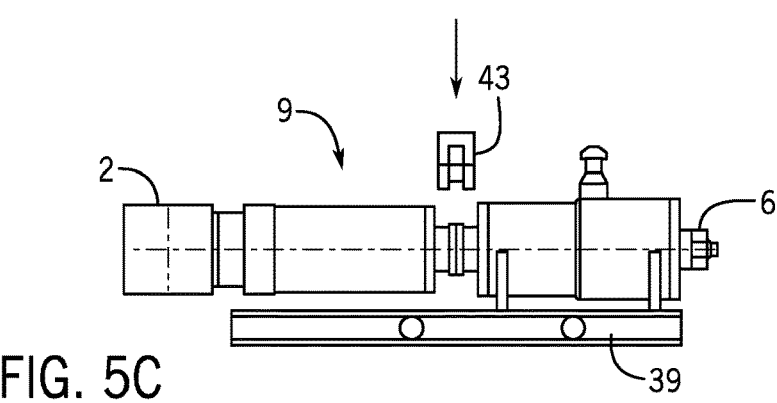

FIGS. 5*a*-5*c* show different and successive steps for docking an actuator 1 to the spring assembly housing 9 and respectively to the valve mechanism 2. In this example, the actuator 1 is (with or without the threaded spindle device 15) lowered from the sea surface by means of a rope 42, possibly with the assistance of an ROV, to receptacles 40 on guides 39. The receptacles 40 may be semi-circular receptacles supporting the motor housing 3, at least from the lower half. The guides 39 may be designed in the form of a carriage, so that overall, the guides with the receptacles 40 are movable in the direction of movement 41 towards the spring assembly housing 9 or towards the valve device 2, respectively. The respective guides may be attached to the spring assembly housing, to the valve mechanism, or also to the Christmas tree and provide for accurate positioning of the connection adapter 8 and the adapter counterpart 25.

After placing the actuator 1 in the respective receptacles 40, see FIG. 5*b*, displacement of the actuator 1 is caused by the ROV or the like until the connection adapter 8 and adapter counterpart 25 contact. In this position, see FIG. 5*c*, the two adapters are connected with each other by means of a closing member 43. Displacement of the actuator from the position according to FIG. 5*b* to the position according to FIG. 5*c* and fitting the closing member 43 may be performed by an ROV.

Removal of the actuator 1 is performed in the reverse sequence according to FIGS. 5*c* to 5*a*.

As already stated, FIGS. 5*a*-5*c* apply to all the above-described embodiments. That is, the spring assembly housing 9, the threaded spindle device 15 or the actuator with the threaded spindle device.

Figure 6:
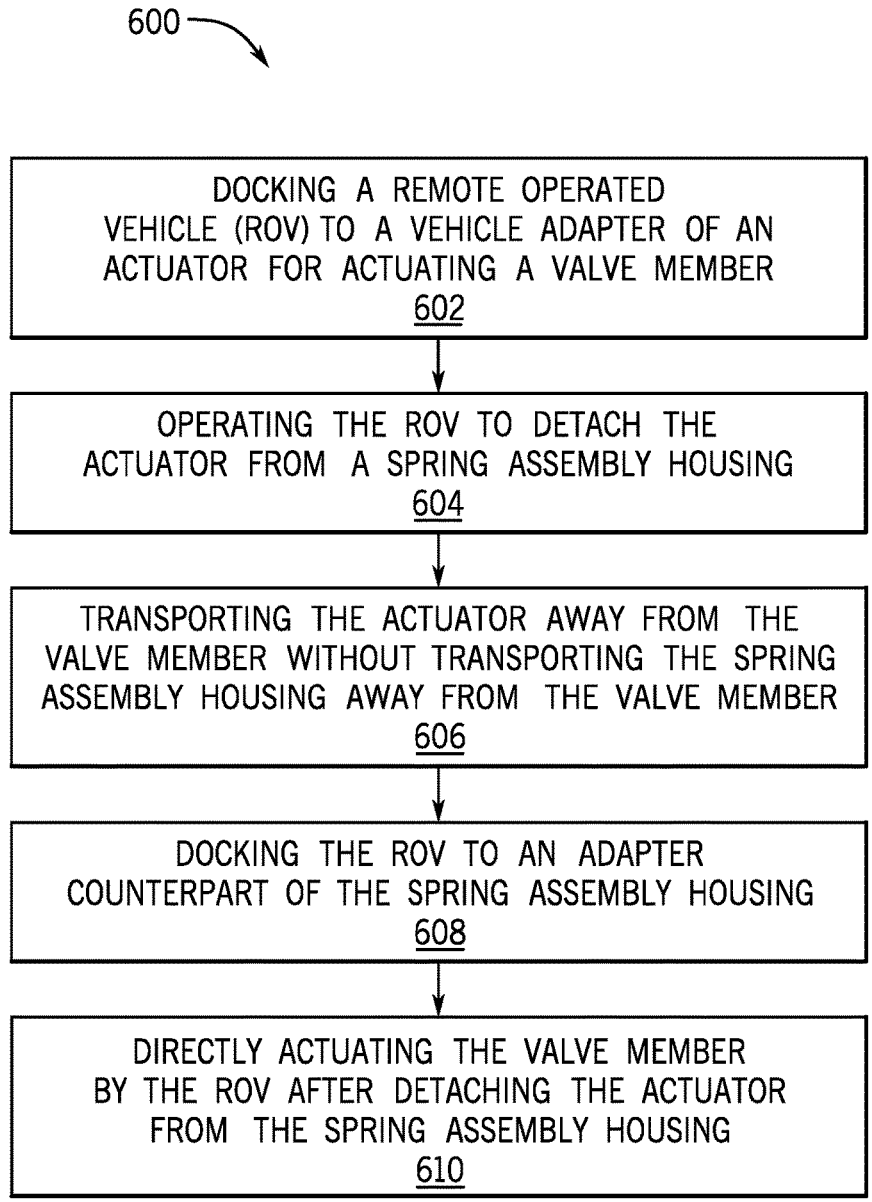
FIG. 6 shows a flow chart of a method in accordance with various embodiments of the present disclosure.

Turning now to FIG. 6, a method 600 is shown in accordance with an embodiment of the present disclosure. The method 600 begins in block 602 with docking an ROV to a vehicle adapter of an actuator that actuates a valve member. As explained above, the ROV may dock to the vehicle adapter 6, which can be located on the motor housing 3 of actuator 1. The method 600 continues in block 604 with operating the ROV to detach the actuator from a spring assembly housing. For example, a closing member 43 may be used to join a connection adapter 8 of the actuator 1 with an adapter counterpart 25 of the spring assembly housing 9. The ROV may remove the closing member such that the connection adapter 8 and adapter counterpart 25 are no longer coupled, at which point the ROV may transport the actuator 1 away from the spring assembly housing 9.

The method 600 continues in block 606 with transporting the actuator away from the valve member without transporting the spring assembly housing away from the valve member. This enables an ROV to transport actuator 1 to the surface, for example to service the actuator, while avoiding the need to also transport the mechanical components contained in the spring assembly housing 9, which may not need to be serviced as regularly as various electronic components of the actuator 1. In block 608, the method 600 continues with docking the ROV to an adapter counterpart of the spring assembly housing and, in block 610, directly actuating the valve member after detaching the actuator from the spring assembly housing. For example, this enables the ROV to perform an emergency actuation of the valve member 26 by engaging the adapter counterpart 25 after the actuator 1 has been removed from the spring assembly housing 9. Additionally, in some embodiments, the ROV may be used to couple or attach a new or replacement actuator 1 to the spring assembly housing 9 in a manner similar to the detachment explained with respect to the method 600.

It should be noted that the use of a gear or a clutch is possible with the torque motor for the previously described embodiments. There is also the option, that the threaded spindle device be arranged in the spring assembly housing, the motor housing and the spring assembly housing being fixedly connected with each other.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An actuator for actuating a valve mechanism, comprising:
    at least one motor housing comprising:
        an electric motor;
        a vehicle adapter at a first housing end of the motor housing to dock with a remote controlled vehicle;
        a first connection adapter at a second housing end, wherein the first connection adapter is configured to rotatingly couple to a first connection adapter counterpart on a spring assembly housing disposed on the valve mechanism, wherein a portion of an exterior surface of the first connection adapter is coupled to an interior surface of the motor housing, and wherein the portion is within the motor housing;
        a push-on sleeve surrounding the first connection adapter and protruding beyond the first connection adapter in a direction of the spring assembly housing; and
    wherein the spring assembly housing comprises a spring assembly that pressurizes a spring piston displaceably mounted in the spring assembly housing.

2. The actuator according to claim 1, wherein the electric motor is a torque motor comprising a stator, a rotor and a hollow shaft rotatable with the rotor.

3. The actuator according to claim 2, wherein the electric motor further comprises a clutch or a transmission gear device.

4. The actuator according to claim 2, wherein the actuator comprises a threaded spindle device having a spindle and a spindle nut, wherein the spindle nut is rotationally connected with the hollow shaft.

5. The actuator according to claim 4, wherein the spindle at its first end facing towards the valve mechanism is associated with a spindle head defining an aperture configured to receive in an axially displaceable manner an extension rod with a second connection adapter.

6. The actuator according to claim 5, wherein an actuator end of the spring assembly housing facing away from the valve mechanism is closed by the first connection adapter counterpart, wherein the first connection adapter counterpart is configured to receive in an axially displaceable manner a connection shaft that serves as a second adapter counterpart for the second connection adapter.

7. The actuator according to claim 6, wherein the connection shaft transmits an axial displacement between the spindle and a valve member of the valve mechanism.

8. The actuator according to claim 6, wherein the connection shaft is mounted in the spring piston in an axially non-displaceable manner.

9. The actuator according to claim 6, wherein the spindle is rotationally mounted in the first connection adapter counterpart.

10. The actuator according to claim 6, wherein the first connection adapter is a female connector and the first connection adapter counterpart is a male connector.

11. The actuator according claim 4, wherein the threaded spindle device is installed in the spring assembly housing.

12. The actuator according to claim 4, wherein the hollow shaft is rotationally connected to an insert end member, the insert end member receives a male end member associated with the spindle for rotary motion connection.

13. The actuator according to claim 12, wherein the spindle and the male end member are connected with each other via a connection member rotationally and sealingly mounted in a housing insert.

14. The actuator according to claim 13, wherein the connection member is arranged substantially centrally in a protecting sleeve projecting from the housing insert.

15. The actuator according to claim 2, wherein a spindle nut is attached in the spring piston and is axially movable with the spring piston against a pressure action from the spring assembly as a result of rotation of a spindle.

16. The actuator according to claim 2, wherein the hollow shaft is rotationally mounted on the vehicle adapter.

17. The actuator according to claim 1, wherein the push-on sleeve comprises a push-on bevel at its open end edge.

18. The actuator accordingly to claim 1, wherein the first connection adapter comprises one or more protrusions and the first connection adapter counterpart comprises a lip, and wherein the one or more protrusions are configured to couple to the lip to dock the at least one motor housing to the spring assembly housing.

19. An actuator for actuating a valve mechanism, comprising:
at least one motor housing comprising:
an electric motor;
a vehicle adapter at a first housing end of the motor housing configured to couple with a remote controlled vehicle;
a connection adapter at a second housing end configured to couple with a spring assembly housing disposed on the valve mechanism; and
a push-on sleeve surrounding the connection adapter and protruding beyond the connection adapter in a direction of the spring assembly housing;
wherein the spring assembly housing comprises a spring assembly that pressurizes a spring piston displaceably mounted in the spring assembly housing.

20. An actuator for actuating a valve mechanism, comprising:
at least one motor housing comprising:
an electric motor;
a vehicle adapter at a first housing end of the motor housing configured to couple with a remote controlled vehicle; and
a first connection adapter at a second housing end, wherein the first connection adapter is configured to rotatingly couple to a first connection adapter counterpart on a spring assembly housing disposed on the valve mechanism;
wherein the spring assembly housing comprises a spring assembly that pressurizes a spring piston displaceably mounted in the spring assembly housing, and a spindle nut coupled to the spring piston, wherein the spindle nut is axially movable with the spring piston against a pressure action from the spring assembly in response to rotation of a spindle.

* * * * *